US008413787B2

(12) United States Patent
Brouwer et al.

(10) Patent No.: US 8,413,787 B2
(45) Date of Patent: Apr. 9, 2013

(54) SWEEPER SORTING APPARATUS AND METHOD

(75) Inventors: David J. Brouwer, Flower Mound, TX (US); Jeffrey R. Giegling, Keller, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 223 days.

(21) Appl. No.: 13/042,634

(22) Filed: Mar. 8, 2011

(65) Prior Publication Data

US 2011/0220459 A1 Sep. 15, 2011

Related U.S. Application Data

(60) Provisional application No. 61/312,272, filed on Mar. 10, 2010.

(51) Int. Cl.
*B65H 47/53* (2006.01)
(52) U.S. Cl. .......... 198/370.08; 198/370.01; 198/370.02
(58) Field of Classification Search ............ 198/370.02, 198/370.07, 370.08, 370.01
See application file for complete search history.

(56) References Cited

U.S. PATENT DOCUMENTS

| | | | | |
|---|---|---|---|---|
| 3,469,887 A | * | 9/1969 | Toyoda et al. | 104/23.2 |
| 3,680,692 A | * | 8/1972 | Southworth | 209/564 |
| 4,318,484 A | * | 3/1982 | Stiernspetz | 209/534 |
| 4,541,520 A | * | 9/1985 | Greenlee, III | 198/370.1 |
| 5,000,657 A | * | 3/1991 | Gunther, Jr. | 414/790.3 |
| 5,609,236 A | * | 3/1997 | Neukam | 198/370.1 |
| 5,743,375 A | * | 4/1998 | Shyr et al. | 198/463.3 |
| 5,899,453 A | * | 5/1999 | Middelberg et al. | 271/184 |
| 5,901,953 A | * | 5/1999 | Brown et al. | 271/184 |
| 6,264,042 B1 | * | 7/2001 | Cossey et al. | 209/559 |
| 6,644,459 B2 | * | 11/2003 | van Leeuwen et al. | 198/370.1 |
| 6,974,019 B2 | * | 12/2005 | Lapeyre et al. | 198/370.02 |
| 6,978,995 B2 | * | 12/2005 | Middelberg et al. | 271/198 |
| 2002/0046921 A1 | * | 4/2002 | MacSwan | 198/370.1 |
| 2003/0075416 A1 | * | 4/2003 | Prutu | 198/370.1 |
| 2004/0226803 A1 | * | 11/2004 | Brixius et al. | 198/370.1 |

* cited by examiner

Primary Examiner — Patrick Mackey

(57) ABSTRACT

A sweeper sorting apparatus for use with a transport belt includes first and second drive belts and a sweeper. The first and second drive belts are positioned adjacent to first and second ends, respectively, of the transport belt and have upper portions oriented substantially parallel to and below an upper surface of the transport belt. The second end of the transport belt is opposite the first end of the transport belt. The sweeper is coupled at a first end to the first drive belt and at a second end to the second drive belt. The sweeper is positioned above the upper surface of the transport belt. At least one of the first drive belt and the second drive belt is operable to move the sweeper across the upper surface of the transport belt to push an item off the upper surface of the transport belt.

20 Claims, 10 Drawing Sheets

SWEEPER SORTING APPARATUS AND METHOD

CROSS-REFERENCE TO RELATED APPLICATIONS

The present application is related to, and claims priority to, U.S. Provisional Patent Application No. 61/312,272, filed Mar. 10, 2010, which is hereby incorporated by reference into the present application as if fully set forth herein.

TECHNICAL FIELD

The present disclosure is directed, in general, to mail and parcel processing techniques.

BACKGROUND OF THE DISCLOSURE

Improved and more efficient systems for transporting and processing parcels, flats, bags and bottles are desirable.

SUMMARY OF THE DISCLOSURE

Various disclosed embodiments include sweeper sorting mechanisms and methods. A sweeper sorting apparatus for use with a transport belt includes a first drive belt, a second drive belt, and a sweeper. The first drive belt is positioned adjacent to a first end of the transport belt and has an upper portion oriented substantially parallel to and below an upper surface of the transport belt. The second drive belt is positioned adjacent to a second end of the transport belt. The second end of the transport belt is opposite the first end of the transport belt. The second drive belt has an upper portion oriented substantially parallel to and below the upper surface of the transport belt. The sweeper is coupled at a first end to the first drive belt and at a second end to the second drive belt. The sweeper is positioned above the upper surface of the transport belt. At least one of the first drive belt and the second drive belt is operable to move the sweeper across the upper surface of the transport belt to push an item off the upper surface of the transport belt.

Another embodiment includes a sorting system that includes a transport belt, a sweeper sorting apparatus, and a controller coupled to the sweeper sorting apparatus. The sweeper sorting apparatus includes a first drive belt, a second drive belt, and a sweeper. The first drive belt is positioned adjacent to a first end of the transport belt and has an upper portion oriented substantially parallel to and below an upper surface of the transport belt. The second drive belt is positioned adjacent to a second end of the transport belt. The second end of the transport belt is opposite the first end of the transport belt. The second drive belt has an upper portion oriented substantially parallel to and below the upper surface of the transport belt. The sweeper is coupled at a first end to the first drive belt and at a second end to the second drive belt. The sweeper is positioned above the upper surface of the transport belt. The controller is adapted to operate at least one of the first drive belt and the second drive belt to move the sweeper across the upper surface of the transport belt to push an item off the upper surface of the transport belt.

Another embodiment includes a method of sorting one or more items. The method includes pushing an item off an upper surface of a transport belt by moving a sweeper across the upper surface of the transport belt. Moving the sweeper includes moving an upper portion of a first drive belt that is adjacent to a first end of the transport belt. The upper portion of the first drive belt is oriented substantially parallel to and below the upper surface of the transport belt and is coupled to a first end of the first sweeper. Moving the sweeper also includes moving an upper portion of a second drive belt that is adjacent to a second end of the transport belt. The second end of the transport belt is opposite the first end of the transport belt. The upper portion of the second drive belt is oriented substantially parallel to and below the upper surface of the transport belt and is coupled to a second end of the first sweeper.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these teens to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Various disclosed embodiments include sorting of items on transport belts, and in particular, sweeping the items from an upper surface of the transport belt. This may be performed as part of other item transport and sorting functions in a sorting system.

In some embodiments, items travel along an upper surface of a transport belt conveyor, which may include a powered roller, end pulley, belt, and slave rollers or a slider bed. When one or more items reach a desired sort location, a motorized roller powers one or more drive belts toward a first or second side of the transport belt to sweep the item(s) off the upper surface of the transport belt. A horizontal upper portion of the drive belts is situated below the upper surface of the transport belt, between the drive and end rollers of the transport conveyor. This allows the items to pass along the transport conveyor without contacting the drive belts. Attached between the drive belts is a sweeper bar with a brush. The sweeper bar pushes the item(s) off the upper surface of the transport belt.

Figure 1:
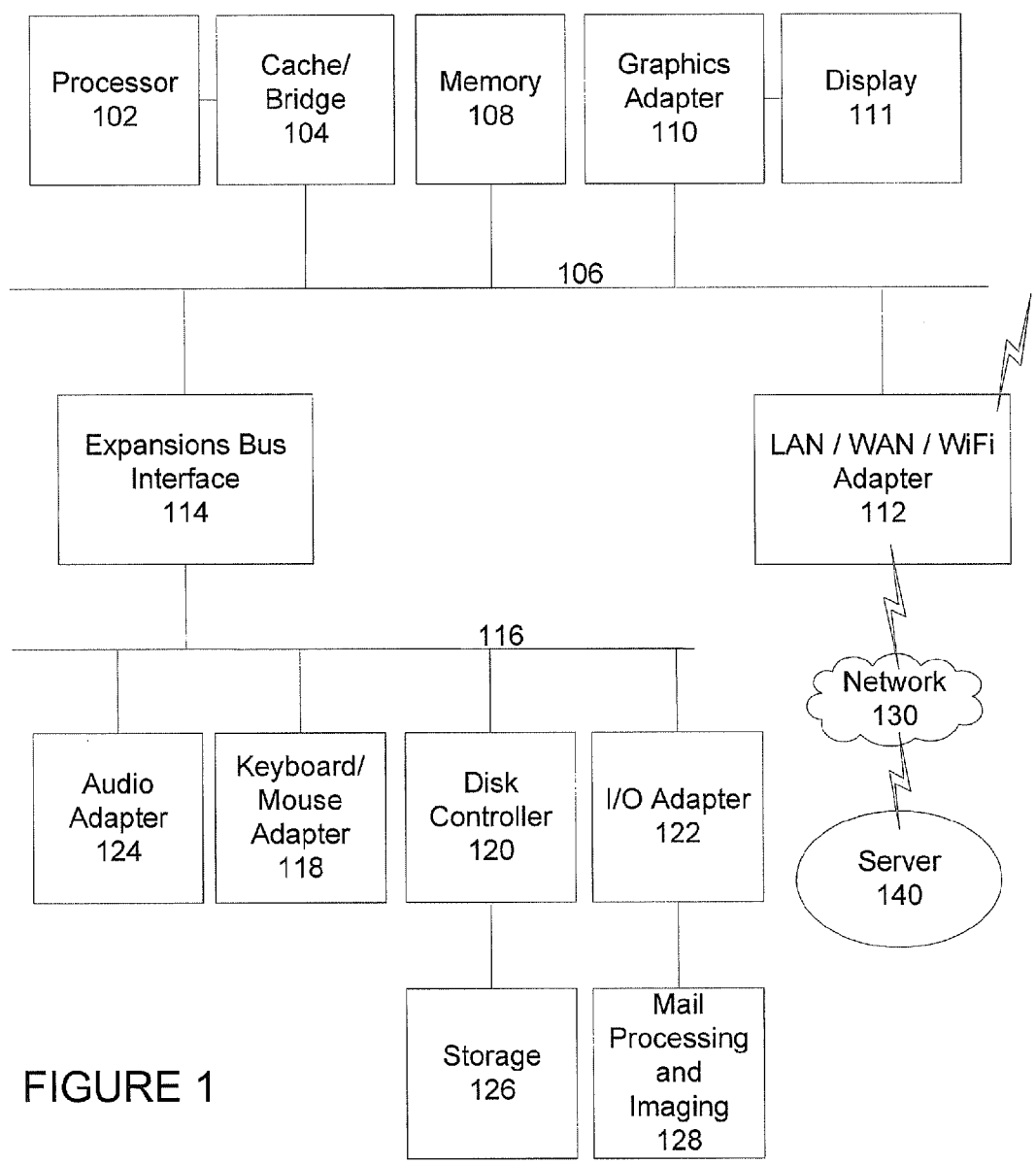
FIG. 1 depicts a block diagram of a data processing system in which an embodiment can be implemented.

FIG. 1 depicts a block diagram of a data processing system 100 in which an embodiment can be implemented, for example as one of the local or central systems or servers described below, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to mail processing and imaging devices 128, as described herein, to image, scan, transport, label, address process, sort, and otherwise processes the mail pieces in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with packages as described herein, and perform other data processing system or server processes described herein. Data processing system 100 can communicate over network 130 with one or more server systems 140, which are also not part of data processing system 100, but can be implemented, for example, as separate data processing systems 100. A server system 140 can be, for example, a central server system at a central mail processing facility.

Figure 2:
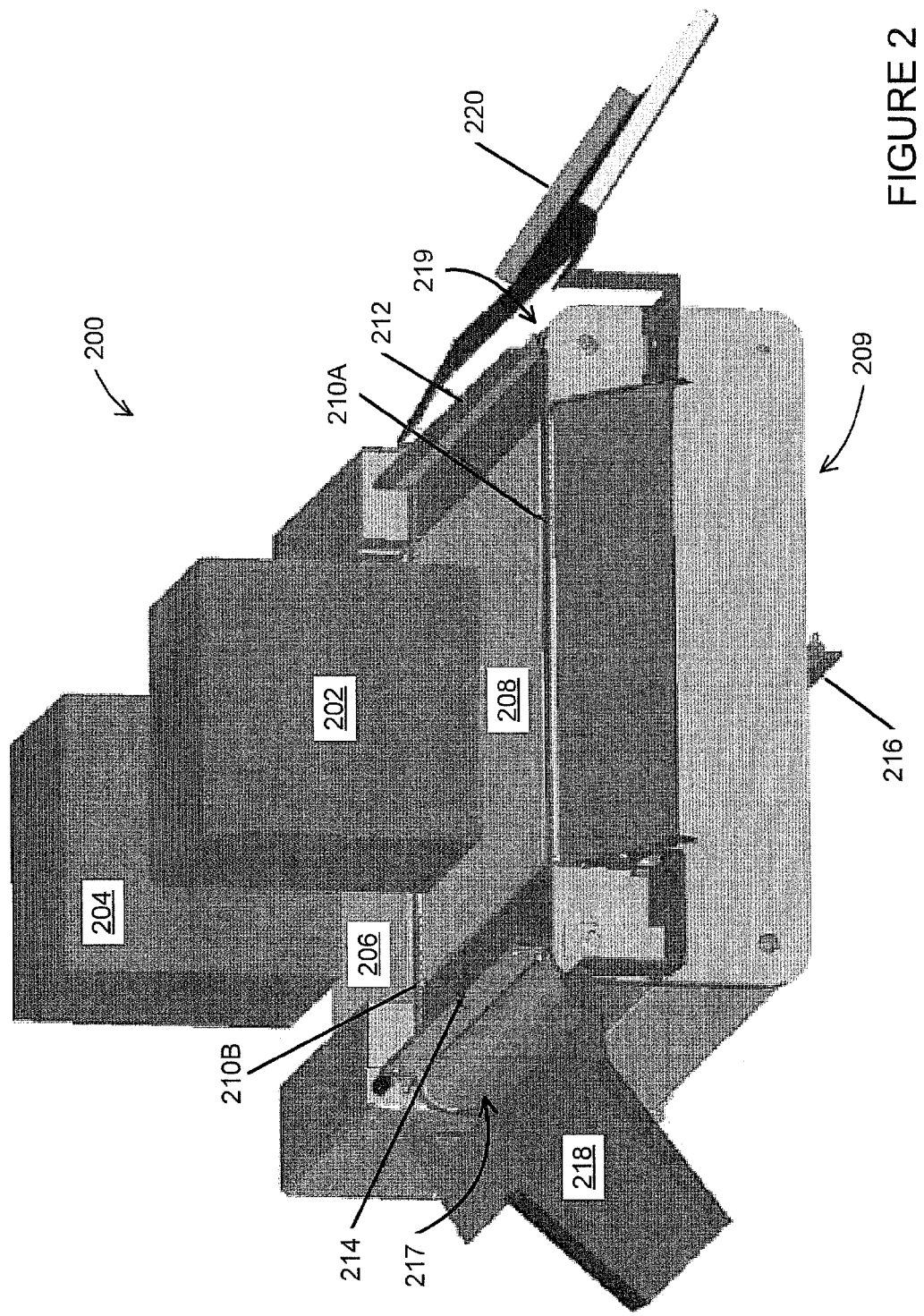
FIG. 2 depicts an orthogonal view of a sorting system according to the disclosure.

FIG. 2 depicts an orthogonal view of a sorting system 200 according to the present disclosure. Parcels 202 and 204 are moved from the rear of FIG. 2 toward the front of FIG. 2 by transport belts 206 and 208. The transport belts 206 and 208 have rotated to position the parcel 202 on the transport belt 208 and the parcel 204 on the transport belt 206. A sweeper sorting apparatus 209 according to the disclosure is operable to push (or sweep) the parcel 202 via a chute 218 or a chute 220 to another transport belt, a hamper, or other destination.

The sweeper sorting apparatus 209 includes drive belts 210A and 210B. The drive belts 210A and 210B are positioned at proximal and distal ends, respectively, of the transport belt 208 (as viewed in FIG. 2). Upper portions of the drive belts 210A and 210B are oriented substantially parallel to an upper surface of the transport belt 208. A sweeper 212 is attached to the upper portions of the drive belts 210A and 210B and is positioned adjacent to a first side of the transport belt 208 that extends from the proximal end to the distal end of the transport belt 208 (the right side, as viewed in FIG. 2). A sweeper 214 is attached to the upper portions of the drive belts 210A and 210B and is positioned adjacent to a second side of the transport belt 208 (the left side, as viewed in FIG. 2) that is opposite the first side. A sweeper 216 is attached to lower portions of the drive belts 210A and 210B and is positioned underneath the transport belt 208.

Opposite ends of the sweepers 212, 214 and 216 are fixedly coupled to the drive belts 210A and 210B, respectively, at three equally spaced locations along the drive belts 210A and 210B. As the drive belts 210A and 210B move together in a clockwise or counterclockwise direction (as seen in FIG. 2), the sweepers 212, 214 and 216 move along with the drive belts 210A and 210B. As will be described in greater detail with reference to FIGS. 3-7, when the drive belts 210A and 210B are rotated in a counterclockwise direction, the sweeper 212 passes across the upper surface of the transport belt 208 and pushes (or sweeps) the parcel 202 onto the chute 218. The drive belts 210A and 210B continue moving in a counterclockwise direction until the sweepers 216, 212 and 214 have reached the locations previously occupied by the sweepers 212, 214 and 216, respectively.

As the sweepers 212, 214 and 216 are moved around the perimeter of the sweeper sorting apparatus 209, they pass through a gap 217 between the sweeper sorting apparatus 209 and the chute 218 and through a gap 219 between the sweeper sorting apparatus 209 and the chute 220. In some embodiments where small parcels or other items are to be handled, the gaps 217 and 219 may be filled with a flexible flap mechanism that allows the sweepers 212, 214 and 216 to pass through the gap, while resisting small parcels or other items falling through the gaps 217 and 219.

While three sweeper apparatuses are coupled to the drive belts 210A and 210B in FIG. 2, in other embodiments, any number of sweeper apparatuses may be attached to drive belts according to the disclosure. While FIG. 2 shows box-shaped parcels 202 and 204, it will be understood that the sweeper sorting apparatus 209 may be used to sweep envelopes, flats (e.g., cardboard envelopes or wrapped magazines), bags, bottles, or other items across a transport belt to a destination.

While FIG. 2 shows only a single parcel on each of the transport belts 206 and 208, it will be understood that a plurality of parcels or other items may be positioned on the transport belt 208 for a sorting operation. Operation of the sweeper sorting apparatus 209 will sweep all parcels on the transport belt 208 onto either the chute 218 or the chute 220.

Figure 3:
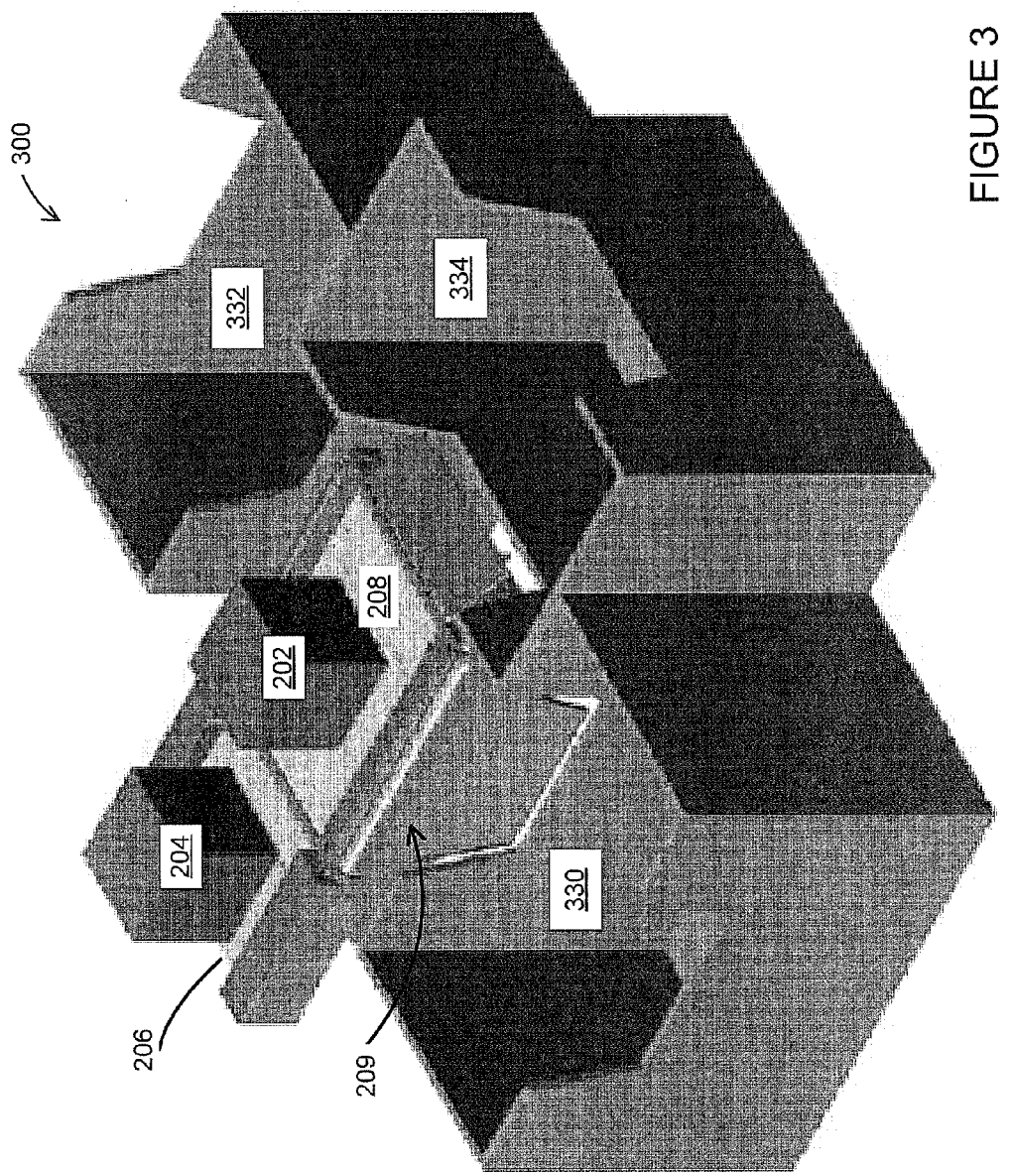
FIGS. 3-7 depict a sorting system according to the disclosure at particular points in time during performance of a sorting operation.

FIG. 3 depicts a sorting system 300 according to the disclosure. As described with reference to FIG. 2, the parcels 202 and 204 are positioned on the transport belts 208 and 206, respectively. From the transport belt 208, the sweeper sorting apparatus 209 may be operated to sweep the parcel 202 into a sorting bin 330 or a sorting bin 332. If the sweeper sorting apparatus 209 is not operated, the transport belt 208 may be operated to move the parcel 202 into a sorting bin 334. With reference to FIGS. 4-7, operation of the sweeper sorting apparatus 209 to sweep the parcel 202 into the sorting bin 330 will be described.

The transport belts 206 and 208 may either stop or keep moving during a sort process. If the speed of the transport belts 206 and 208 is sufficiently slow, by comparison to the speed of operation of the sweeper sorting apparatus 209, the transport belts may be allowed to continue moving. However, if the belt speed is too fast, the transport belts may need to stop to keep the package 204 from entering the sorting zone (i.e., moving onto the transport belt 208) during operation of the sweeper sorting apparatus 209.

Figure 4:
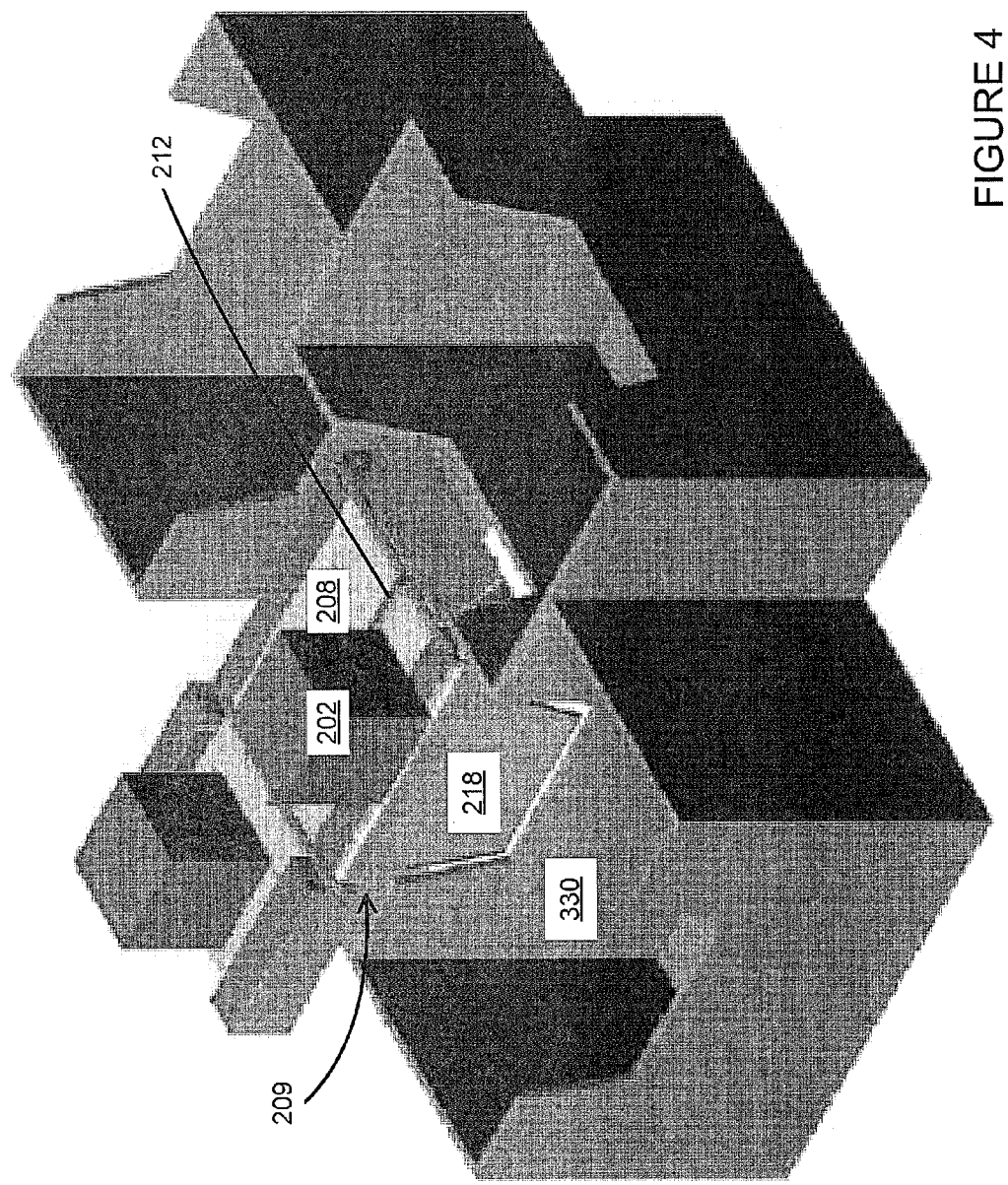

FIG. 4 depicts the sweeper sorting apparatus 209 at a midpoint in the process of sweeping the parcel 202 into the sorting bin 330. The sweeper 212 has moved partway across the transport belt 208 and the parcel 202 is partway onto the chute 218. As the sweeper 212 continues its motion across the upper surface of the transport belt 208, the parcel 202 will be pushed fully onto the chute 218, where it will slide down into the sorting bin 330.

Figure 5:
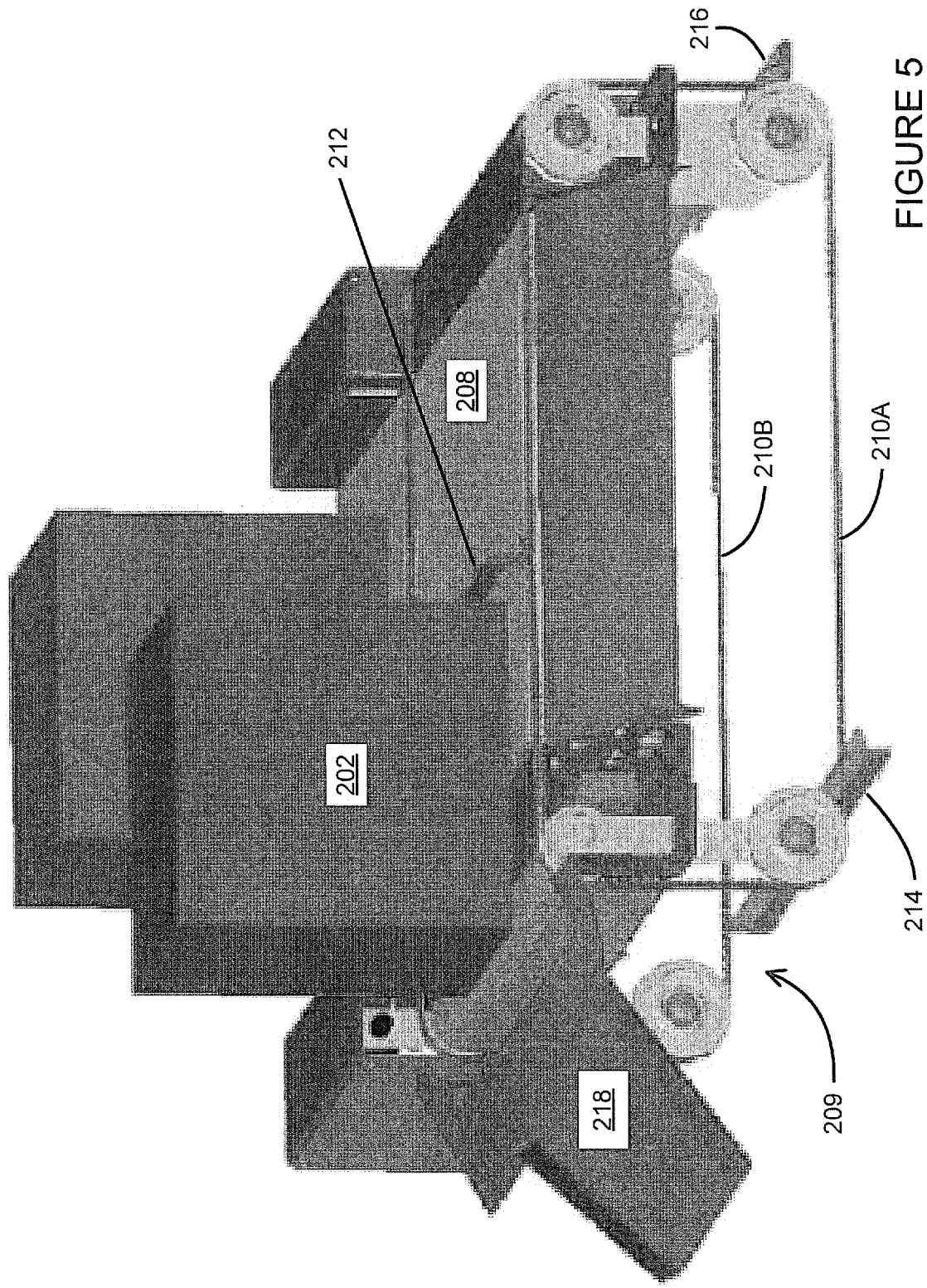

FIG. 5 depicts the sweeper sorting apparatus 209 at the same stage of operation as depicted in FIG. 4, with elements of the sorting system 300 removed to expose relative positions of various elements of the sweeper sorting apparatus 209. The drive belts 210A and 210B have been rotated to move the sweeper 212 across the upper surface of the transport belt 208, sweeping the parcel 202 partway onto the chute 218. The motion of drive belts 210A and 210B has also moved the sweeper 214 around to a bottom side of the sweeper sorting apparatus 209 and the sweeper 216 around to a side of the sweeper sorting apparatus 209 (the right side, as viewed in FIGS. 4-7). When the sweeper sorting apparatus 209 completes its operation, the drive belts 210A and 210B will have rotated the sweeper 212 into the position previously occupied by the sweeper 214, and the sweeper 214 into the position on the bottom side of the sweeper sorting apparatus 209 previously occupied by the sweeper 216. Thus positioned, the sweeper sorting apparatus 209 will be arranged to sweep the parcel 204 off the transport belt 208, if required, in a subsequent sweeping operation.

While operation of the sweeper sorting apparatus 209 to move the drive belts 210A and 210B in a counterclockwise direction (as viewed in FIG. 5) to sweep the parcel 202 into the sorting bin 330 is described with reference to FIGS. 4-7, it will be understood that the drive belts 210A and 210B may, in the alternative, be moved in a clockwise direction to cause the sweeper 214 to sweep the parcel 202 into the sorting bin 332.

The sweeper sorting apparatus 209 includes three sweepers (212, 214 and 216). In other embodiments, any number of sweepers (e.g., one or more) may be used in a sweeper sorting apparatus according to the disclosure. Where a single sweeper is used, its rest position may be the position shown in FIG. 2 for the sweeper 216, so that the sweeper is equidistant from a parcel to be swept, whether the parcel is to be swept to the left or to the right. Where two or more sweepers are used, positions of the sweepers along the drive belts are selected according to a width of an associated transport belt. Sweepers are positioned along the drive belts with sufficient separation that the sweepers may be positioned on opposite sides of the transport belt while at rest. So positioned, the sweepers do not obstruct passage of a parcel along the transport belt.

Figure 6:
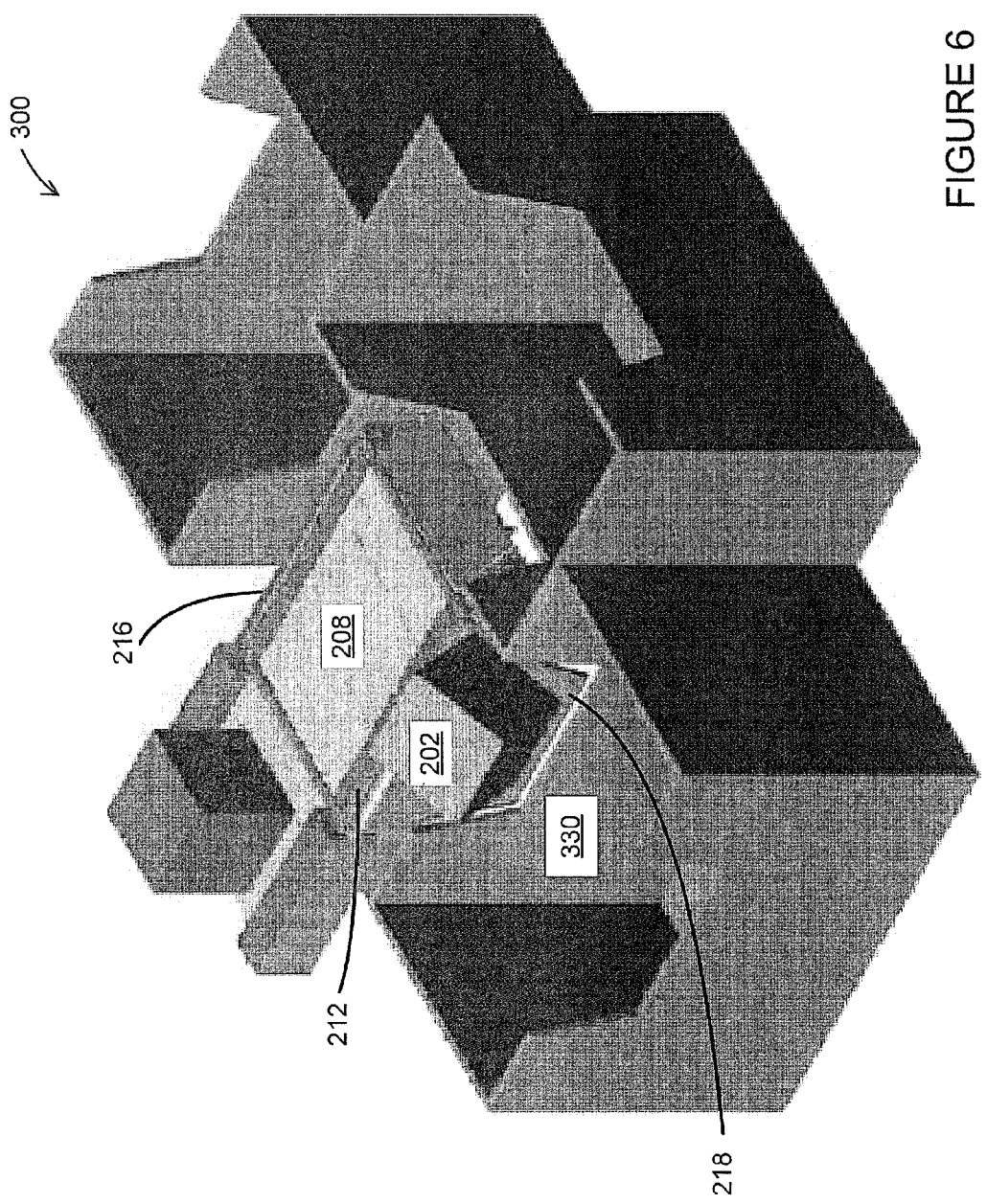

FIG. 6 depicts the sorting system 300 after it completes its operation. The sweeper 216 is now positioned on the right side of the transport belt 208 (as viewed in FIG. 6), the sweeper 212 is now positioned on the left side of the transport belt 208, and the parcel 202 is on the chute 218 and sliding into the sorting bin 330.

Figure 7:
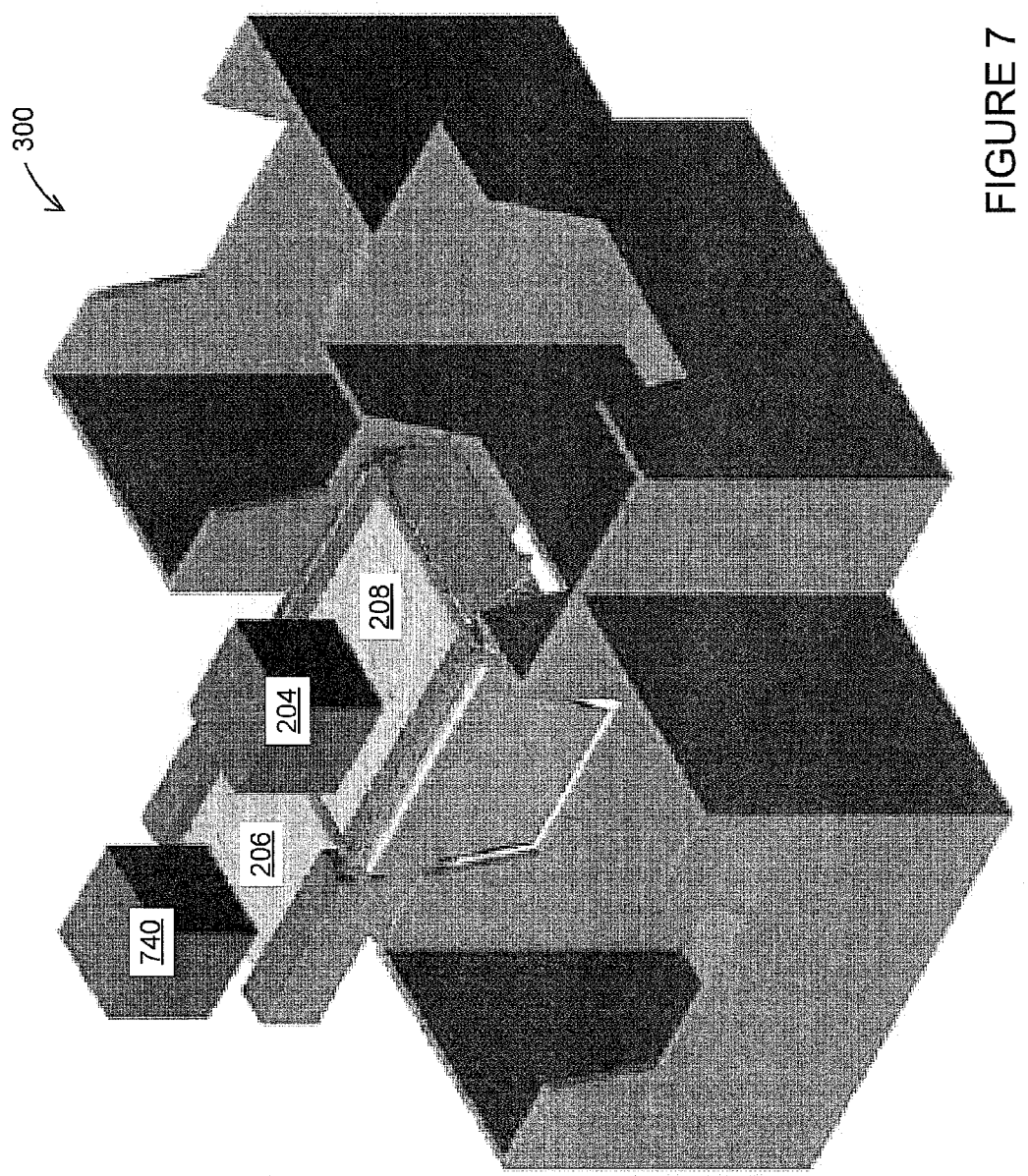

FIG. 7 depicts the sorting system 300 after the transport belts 206 and 208 have been operated to move the parcel 204 into position on the transport belt 208 for sorting, if required, by the sweeper sorting apparatus 209. Additionally, a parcel 740 is shown moving into position on the transport belt 206.

Figure 8:
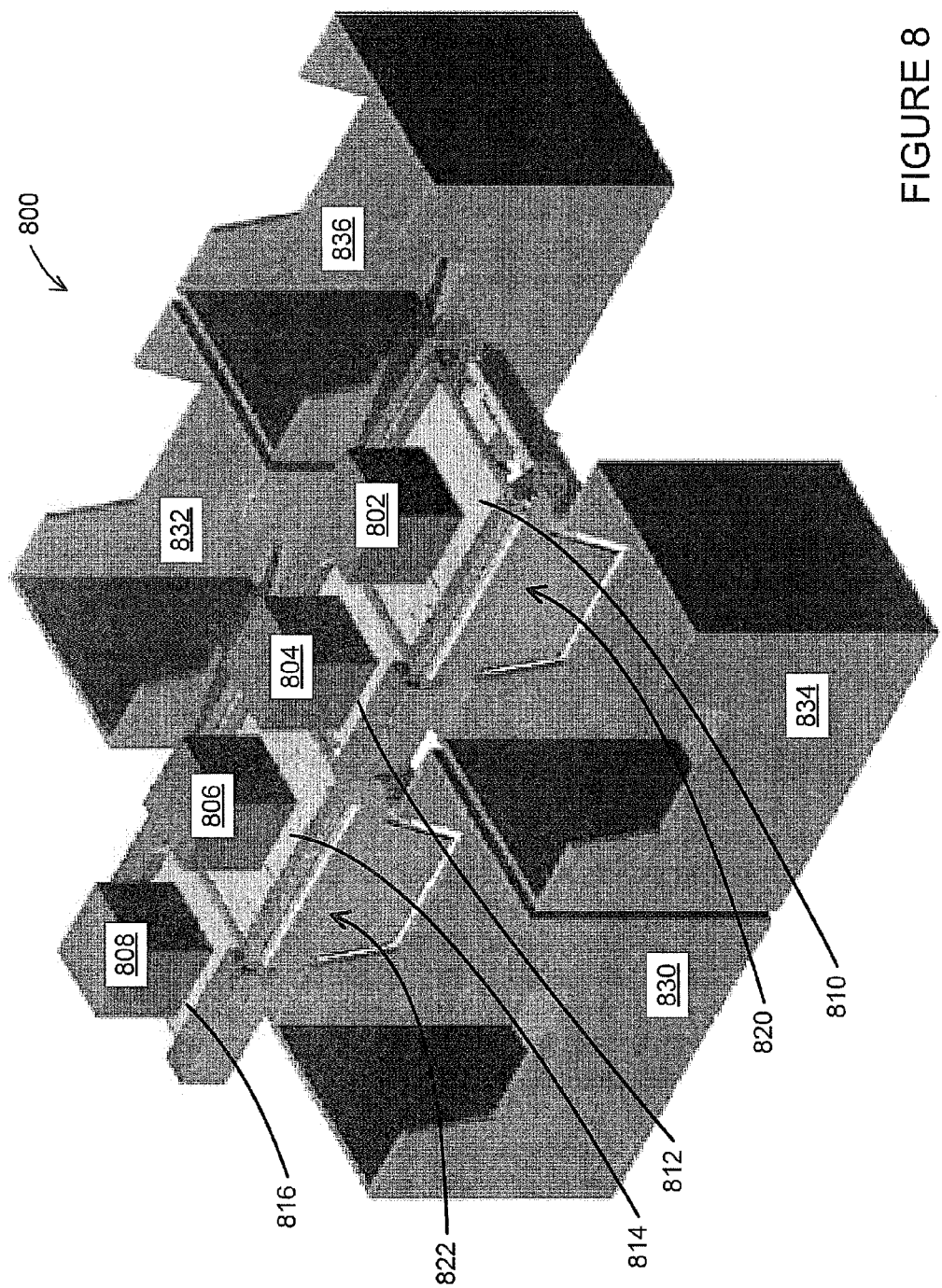
FIG. 8 depicts a multi-stage sorting system according to the disclosure.

FIG. 8 depicts a multi-stage sorting system 800 according to the disclosure, which has two sorting stations. Parcels 802, 804, 806 and 808 are positioned, respectively, on transport belts 810, 812, 814 and 816. A sweeper sorting apparatus 820 is coupled to the transport belt 810, and a sweeper sorting apparatus 822 is coupled to the transport belt 814. The sweeper sorting apparatus 822 may be operated to sweep the parcel 806 into either a sorting bin 830 or a sorting bin 832. The sweeper sorting apparatus 820 may be operated to sweep the parcel 802 into either a sorting bin 834 or a sorting bin 836.

While FIGS. 3-7 depict a single sorting station and FIG. 8 depicts two sorting stations (transport belts 810 and 814), other embodiments may include three or more sorting stations. While the transport belt 812 is shown having a length that only accommodates the single parcel 804, in other embodiments a plurality of parcels, flats, bags or other items may be positioned on the transport belt 812. Furthermore, in such embodiments, the transport belt 812 may be operated to move only a first one of such a plurality of items onto the transport belt 810 for sorting by the sweeper sorting apparatus 820.

Figure 9:
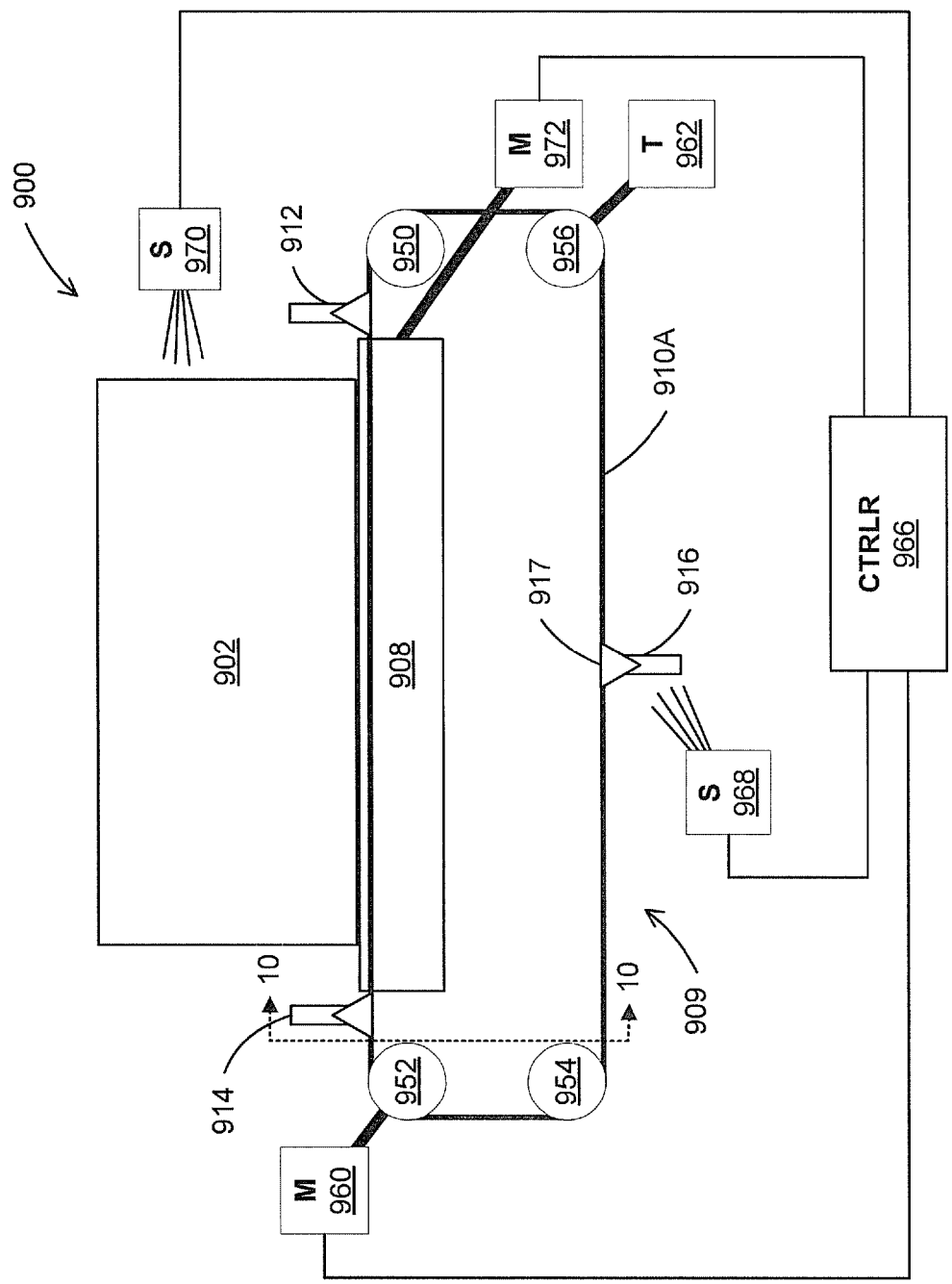
FIG. 9 depicts a schematic diagram of a sorting system according to the disclosure.

FIG. 9 depicts a schematic diagram of a sorting system 900 according to the disclosure. FIG. 9 presents both electrical and mechanical elements of the system 900 in a schematic format. The system 900 is viewed end-on along the direction of motion of a transport belt 908, upon which is positioned a parcel 902. A sweeper sorting apparatus 909 includes sweepers 912 and 914, which are positioned to either side of the parcel 902 and the transport belt 908 and extend into the page, as viewed in FIG. 9. The sweepers 912 and 914 may be operated to sweep the parcel 902 off the transport belt 908 to the left or to the right, respectively.

The sweepers 912 and 914 are fixedly coupled to a drive belt 910A (as well as to a drive belt 910B, not shown in FIG. 9). Also fixedly coupled to the drive belts 910A and 910B is a sweeper 916. The sweepers 912, 914 and 916 are coupled to one or both of the belts 910A and 910B by a gusset (or support structure) 917. The gusset 917 provides structural support to the sweepers 912, 914 and 916 to resist rotation of the sweepers 912, 914 and 916 about their longitudinal axes away from their vertical orientation relative to the belts 910A and 910B. In other embodiments, another form of support structure may be used to resist rotation of a sweeper relative to a drive belt, or no structural support may be provided and the sweeper allowed to rotate relative to the drive belt.

The drive belt 910A is positioned around an idler roller 950, a drive roller 952, a tensioning roller 954, and an idler roller 956. A motor 960 is mechanically coupled to the drive roller 952 and is operable to rotate the drive roller 952 to pull the drive belt 910A and the sweepers 912, 914 and 916 in either a clockwise or counterclockwise direction. A tensioning mechanism 962 is mechanically coupled to the tensioning roller 954 and is operable to produce a desired tension in the drive belt 910A to reduce slipping of the belt 910A along the drive rollers 950 and 952 and improve reliability of operation of the sweeper sorting apparatus 909.

The drive belt 910A is a toothed timing belt and the rollers 950, 952, 964 and 956 are rollers with teeth of a corresponding pitch. In other embodiments, other types of belts (such as V-belts) or chains may be used to move the sweepers 912, 914, and 916 across an upper surface of the transport belt 908.

In other embodiments, a second motor may be mechanically coupled to the roller 950 to pull the drive belt 910A in a clockwise direction. In some embodiments, the rollers 950, 952, 954 and 956 are pulleys that support only one of the drive belts 910A and 910B. In other embodiments, the rollers 950, 952, 954 and 956 extend the full length of the transport belt 908 and support both the drive belts 910A and 910B.

Operation of the sorting system 900 and the sweeper sorting apparatus 909 is controlled by a controller 966, which may be implemented, for example, in the data processing system 100 or other suitable microcontroller, programmable logic device, etc. The controller 966 is electrically coupled to the motor 960 and operable to power the motor 960 to move the drive roller 952, which moves the drive belt 910A, which moves one of the sweepers 912 and 914 across the upper surface of the transport belt 908. The controller is also electrically coupled to a sensor 968, which is operable to sense a position of at least one of the drive belts 910A and 910B. The sensor 968 is operable to sense the sweeper 916 when the drive belt 910A is at the rest position shown in FIG. 9. In this way, the controller 966 is operable to determine when the sweeper sorting apparatus 909 is in position to permit parcels to be moved onto the transport belt 908 for sorting. The controller 966 is thus adapted to operate the sweeper sorting apparatus 909 in a clockwise or counterclockwise direction to sweep the parcel 902 off of the transport belt 908 to the right or to the left, respectively.

In the rest position shown in FIG. 9, the sensor 968 senses the sweeper 916. After operation of the sweeper sorting apparatus 909 to sweep the parcel 902 off the transport belt 908, the sensor 968 may sense either the sweeper 212 or the sweeper 214, according to whether the sweeper sorting apparatus 909 has rotated clockwise or counterclockwise during the sweeping operation. In other embodiments, one or more sensors may be positioned to sense other features of the drive belt 910A and or 910B to determine a current position of the sweeper sorting apparatus 909. In still other embodiments, one or more sensors may be used to detect rotation of one or more of the rollers 950, 952, 954 and 956 to determine the current position of the sweeper sorting apparatus 909. In other embodiments, the motor 960 and sensors on one or more of the rollers 950, 952, 954 and 956 may form a servomechanism for control of the current position of the sweeper sorting apparatus 909. In still other embodiments, the motor 960 is a stepper motor, one or more sensors are used to detect an index position of the sweeper sorting apparatus 909, and the motor 960 is operated in an open-loop configuration by counting steps.

The controller 966 is also electrically coupled to a sensor 970, which is operable to sense a label, RFID tag, barcode, or other identifying feature of the parcel 902 on the transport belt 908. The controller 966 uses identifying information of the parcel 902 sensed by the sensor 970 to determined whether the parcel 902 should be swept to the left or to the right from the transport belt 908. In a multi-stage sorting system (such as the system 800 shown in FIG. 8), the controller 966 may determine that the parcel 902 is not to be swept off the transport belt 908 by the sweeper sorting apparatus 909 and, instead, is to be moved along to another sorting station in the system 800.

Referring again to FIG. 8, in some embodiments, the sensor 970 is positioned to read identifying information from parcels before the parcels reach the sweeper sorting apparatuses 820 and 822 (e.g., adjacent the transport belt 816). In such embodiments, the controller 966 may use information regarding speeds of the transport belts 816, 814, 812 and 810 to calculate a time required for the parcel to reach an appropriate one of the sweeper sorting apparatuses 820 and 822, and may activate the appropriate sweeper sorting apparatus once the calculated period of time has passed. In other such embodiments, additional sensors coupled to the controller 966 may be placed at the sweeper sorting apparatuses 820 and 822 to provide confirmation of the presence of a parcel to be sorted.

The controller 966 is also electrically coupled to a motor 972, which is mechanically coupled to the transport belt 908. The controller 966 is operable to power the motor 972 to move the parcel 902 onto the transport belt 908 from a previous transport belt and off of the transport belt 908 into a sorting bin (as shown in FIG. 3) or onto a subsequent transport belt (as shown in FIG. 8). The controller 966 is thus operable to control all elements of the sorting system 900.

Figure 10:
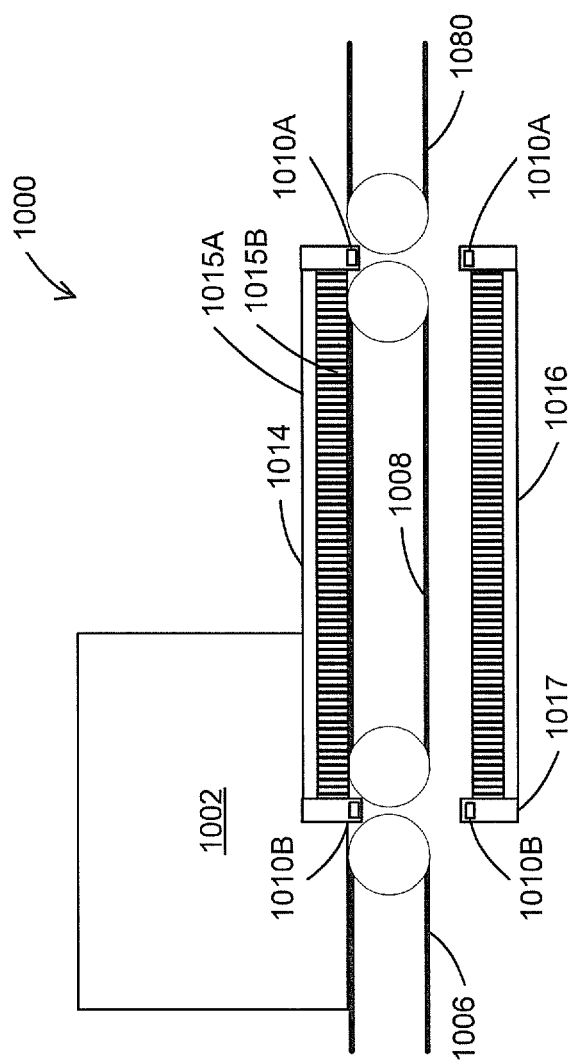
FIG. 10 depicts a schematic diagram of another sorting system according to the disclosure.

FIG. 10 depicts a schematic diagram of a sorting system 1000 according to the disclosure. FIG. 10 presents a cut-away view of the sorting system 1000 generally as indicated by the line 10-10 in FIG. 9. The system 1000 includes transport belts 1006, 1008 and 1080 positioned end-to-end and operable to move a parcel 1002 or other item from one transport belt to another.

A drive belt 1010A is positioned at a first end of the transport belt 1008 and a drive belt 1010B is positioned at an opposite end of the drive belt 1008. A sweeper 1014 is mechanically coupled at a first end to an upper portion of the drive belt 1010A and at a second end to an upper portion of the drive belt 1010B. A sweeper 1016 is mechanically coupled to a lower portion of the drive belts 1010A and 1010B. The sweepers 1014 and 1016 are coupled to the drive belts 1010A and 1010B at both ends by gussets 1017. The upper portions of the drive belts 1010A and 1010B are oriented substantially parallel to an upper surface of the transport belt 1008. The upper portions of the drive belts 1010A and 1010B are positioned below the upper surface of the transport belt 1008, so as not to obstruct a parcel as it moves onto or off of the transport belt 1008.

The sweeper 1014 includes a bar 1015A, to which is mounted a brush 1015B. The bar 1015A and the brush 1015B are positioned above the upper surface of the transport belt 1008. The brush 1015B extends from the bar toward the upper surface of the transport belt 1008. The brush 1015B may contact the transport belt 1008 as the sweeper 1014 moves through its sorting motion without causing significant wear to the transport belt 908. Additionally, the brush 1015B reduces the likelihood that an object will become wedged between the bar 1015A and the transport belt 908, preventing motion of the sweeper 1014 or damaging the transport belt 908. In other embodiments, a plastic or rubber flap or other flexible structure may be used instead of the brush 1015B. In still other embodiments, a stiff structure may be used instead of the brush 1015B and the sweeper 1014 configured so that a lower edge of the stiff structure is positioned adjacent to, but not in contact with, the transport belt 908.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A sweeper sorting apparatus for use with a transport belt, comprising:
   a first drive belt positioned adjacent to a first end of the transport belt and having an upper portion oriented substantially parallel to and below an upper surface of the transport belt;
   a second drive belt positioned adjacent to a second end of the transport belt, the second end of the transport belt opposite the first end of the transport belt, the second drive belt having an upper portion oriented substantially parallel to and below the upper surface of the transport belt; and
   a first sweeper coupled at a first end to the first drive belt and at a second end to the second drive belt, the first sweeper positioned above the upper surface of the transport belt,
   wherein at least one of the first drive belt and the second drive belt is operable to move the first sweeper across the upper surface of the transport belt to push an item off the upper surface of the transport belt.

2. The sweeper sorting apparatus of claim 1, wherein the first sweeper comprises:
   a bar coupled at a first end to the first drive belt and at a second end to the second drive belt; and
   a brush mounted to the bar and extending toward the upper surface of the transport belt.

3. The sweeper sorting apparatus of claim 1, further comprising a support structure coupling the first sweeper to the first drive belt, the support structure adapted to resist rotation of the first sweeper relative to the first drive belt.

4. The sweeper sorting apparatus of claim 1, further comprising a second sweeper coupled at a first end to the first drive belt and at a second end to the second drive belt, the second sweeper positioned above the upper surface of the transport belt, wherein
   the second sweeper is positioned adjacent to a first side of the transport belt, the first side extending between the first end and the second end of the transport belt,
   the first sweeper is positioned adjacent to a second side of the transport belt, the second side extending between the first end and the second end of the transport belt, the second side of the transport belt opposite the first side of the transport belt,
   at least one of the first drive belt and the second drive belt is operable to move the first sweeper across the upper surface of the transport belt to push an item off the first side of the transport belt, and
   at least one of the first drive belt and the second drive belt is operable to move the second sweeper across the upper surface of the transport belt to push an item off the second side of the transport belt.

5. The sweeper sorting apparatus of claim 1, further comprising a motor coupled to at least one of the first drive belt and the second drive belt and operable to move the first sweeper across the upper surface of the transport belt.

6. The sweeper sorting apparatus of claim 5, further comprising a controller coupled to the motor and adapted to operate the motor to move the first sweeper across the upper surface of the transport belt.

7. The sweeper sorting apparatus of claim 6, further comprising a sensor coupled to the controller, the sensor operable to sense a position of at least one of the first drive belt and the second drive belt, wherein the controller is adapted to move the first sweeper based upon the sensed position of the at least one of the first drive belt and the second drive belt.

8. A sorting system, comprising:
a transport belt;
a sweeper sorting apparatus; and
a controller coupled to the sweeper sorting apparatus, wherein
the sweeper sorting apparatus includes
a first drive belt positioned adjacent to a first end of the transport belt and having an upper portion oriented substantially parallel to and below an upper surface of the transport belt,
a second drive belt positioned adjacent to a second end of the transport belt, the second end of the transport belt opposite the first end of the transport belt, the second drive belt having an upper portion oriented substantially parallel to and below the upper surface of the transport belt, and
a first sweeper coupled at a first end to the first drive belt and at a second end to the second drive belt, the first sweeper positioned above the upper surface of the transport belt, and
the controller is adapted to operate at least one of the first drive belt and the second drive belt to move the first sweeper across the upper surface of the transport belt to push an item off the upper surface of the transport belt.

9. The sorting system of claim 8, wherein the first sweeper includes
a bar coupled at a first end to the first drive belt and at a second end to the second drive belt, and
a brush mounted to the bar and extending toward the upper surface of the transport belt.

10. The sorting system of claim 8, wherein the sweeper sorting apparatus further includes a support structure coupling the first sweeper to the first drive belt, the support structure adapted to resist rotation of the first sweeper relative to the first drive belt.

11. The sorting system of claim 8, wherein
the sweeper sorting apparatus further includes a second sweeper coupled at a first end to the first drive belt and at a second end to the second drive belt, the second sweeper positioned above the upper surface of the transport belt,
the first sweeper is positioned adjacent to a first side of the transport belt, the first side extending between the first end and the second end of the transport belt,
the second sweeper is positioned adjacent to a second side of the transport belt, the second side extending between the first end and the second end of the transport belt, the second side of the transport belt opposite the first side of the transport belt,
at least one of the first drive belt and the second drive belt is operable to move the second sweeper across the upper surface of the transport belt to push an item off the first side of the transport belt, and
at least one of the first drive belt and the second drive belt is operable to move the first sweeper across the upper surface of the transport belt to push an item off the second side of the transport belt.

12. The sorting system of claim 8, wherein the sweeper sorting apparatus further includes a motor coupled to at least one of the first drive belt and the second drive belt and operable to move the first sweeper across the upper surface of the transport belt.

13. The sorting system of claim 12, wherein the controller is coupled to the motor and adapted to operate the motor to move the first sweeper across the upper surface of the transport belt.

14. The sorting system of claim 13, wherein the sweeper sorting apparatus further includes a sensor coupled to the controller, the sensor operable to sense a position of at least one of the first drive belt and the second drive belt, wherein the controller is adapted to move the first sweeper based upon the sensed position of the at least one of the first drive belt and the second drive belt.

15. A method of sorting one or more items, the method comprising:
pushing a first item off an upper surface of a transport belt by moving a first sweeper across the upper surface of the transport belt,
wherein moving the first sweeper includes
moving an upper portion of a first drive belt adjacent to a first end of the transport belt, the upper portion of the first drive belt oriented substantially parallel to and below the upper surface of the transport belt and coupled to a first end of the first sweeper, and
moving an upper portion of a second drive belt adjacent to a second end of the transport belt, the second end of the transport belt opposite the first end of the transport belt, the upper portion of the second drive belt oriented substantially parallel to and below the upper surface of the transport belt and coupled to a second end of the first sweeper.

16. The method of claim 15, wherein the first sweeper includes:
a bar coupled at a first end to the first drive belt and at a second end to the second drive belt; and
a brush mounted to the bar and extending toward the upper surface of the transport belt.

17. The method of claim 15, wherein pushing the first item off the upper surface of the transport belt by moving the first sweeper includes pushing the first item off a first side of the transport belt, the first side extending between the first end and the second end of the transport belt, the method further including:
pushing a second item off the upper surface of a transport belt by moving a second sweeper across the upper surface of the transport belt, the second item being pushed off a second side of the transport belt, the second side extending between the first end and the second end of the transport belt opposite the first side of the transport belt,
wherein moving the second sweeper includes
moving the upper portion of the first drive belt, the upper portion of the first drive belt coupled to a first end of the second sweeper, and
moving the upper portion of the second drive belt, the upper portion of second drive belt coupled to a second end of the second sweeper.

18. The method of claim 15, wherein one of moving the upper portion of the first drive belt and moving the upper portion of the second drive belt includes operating a motor coupled to the one of the first drive belt and the second drive belt.

19. The method of claim 18, wherein the motor is operated by a controller.

20. The method of claim 18, further including operating the motor based upon a sensed position of at least one of the first drive belt and the second drive belt.

* * * * *